United States Patent
Rivera

(10) Patent No.: US 8,024,853 B2
(45) Date of Patent: Sep. 27, 2011

(54) HEAD GIMBAL ASSEMBLY (HGA) CONNECTOR PAD ALIGNMENT JIG

(75) Inventor: Rudel P. Rivera, Caloocan (PH)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 217 days.

(21) Appl. No.: 12/004,556

(22) Filed: Dec. 19, 2007

(65) Prior Publication Data

US 2009/0158583 A1 Jun. 25, 2009

(51) Int. Cl.
*G11B 5/48* (2006.01)
*G11B 5/127* (2006.01)

(52) U.S. Cl. .......... 29/737; 29/759; 29/705; 29/603.03; 29/603.09; 360/245.3; 324/415

(58) Field of Classification Search .......... 29/732–737, 29/603.7, 739, 729; 73/865.9; 324/212, 324/262, 415, 755; 360/128, 365, 55, 265.7, 360/737, 274, 266, 264.2, 245.1–245.9; 439/67; 702/150, 108
See application file for complete search history.

(56) References Cited

U.S. PATENT DOCUMENTS

| | | | |
|---|---|---|---|
| 4,004,843 A | 1/1977 | Boenning et al. | |
| 4,892,122 A | 1/1990 | Ickes | |
| 4,964,941 A * | 10/1990 | Von Brandt et al. | 29/603.04 |
| 5,347,215 A | 9/1994 | Armstrong et al. | |
| 5,536,181 A | 7/1996 | Karnavas | |
| 5,572,144 A | 11/1996 | Davidson et al. | |
| 5,848,477 A | 12/1998 | Wiedmann et al. | |
| 5,952,843 A | 9/1999 | Vinh | |
| 6,105,421 A * | 8/2000 | Yao et al. | 73/105 |
| 6,150,813 A * | 11/2000 | Schadewald et al. | 324/262 |
| 6,336,276 B1 | 1/2002 | Krajec et al. | |
| 6,378,195 B1 * | 4/2002 | Carlson | 29/603.03 |
| 6,671,131 B2 * | 12/2003 | Kasajima et al. | 360/294.4 |
| 6,859,055 B2 | 2/2005 | Wilk | |
| 6,934,111 B2 * | 8/2005 | Krause et al. | 360/75 |
| 6,946,861 B2 | 9/2005 | Lee et al. | |
| 7,131,346 B1 * | 11/2006 | Buttar et al. | 73/865.9 |
| 7,176,702 B2 | 2/2007 | Cram | |
| 7,506,552 B2 * | 3/2009 | Hernandez et al. | 73/862.191 |
| 2009/0158583 A1 * | 6/2009 | Rivera | 29/737 |

FOREIGN PATENT DOCUMENTS

WO WO-2006/030573 3/2006

OTHER PUBLICATIONS

Fenton, Bob "Strip Testing: Uniformity in Final Package Test", *Advanced Packaging*, (2007),1-6.
Electroglas, et al., "Extended Performance 200 MM Prober for High-Volume and Leading-Edge Manufacturing", *Electroglas*, (May 2006),1-2.

* cited by examiner

*Primary Examiner* — Minh Trinh

(57) ABSTRACT

A head gimbal assembly (HGA) connector pad alignment jig is disclosed. One embodiment provides an HGA testing jig for holding an HGA, the HGA testing jig including an opening at a location of the HGA connector pads. In addition, an HGA testing apparatus including a disk for testing the HGA and a controller with a plurality of pin connectors for providing control information to the HGA during a testing process. Thus, the present technology provides an alignment adjuster for adjusting the location of the pin connectors with respect to the connector pads to ensure a good electrical connection between the HGA connector pads and the pin connectors.

6 Claims, 5 Drawing Sheets

500

START
510

↓

POSITION AN HGA HAVING A FLEXURE CABLE AND CONNECTOR PADS IN A TESTING JIG INCLUDING AN OPENING AT A LOCATION OF THE CONNECTOR PADS.
520

↓

POSITION THE TESTING JIG WITH AN HGA TESTING APPARATUS INCLUDING A DISK FOR TESTING THE HGA AND A CONTROLLER WITH A PLURALITY OF PIN CONNECTORS FOR CONTROLLING THE HGA DURING THE TESTING PROCESS.
530

↓

ADJUSTING THE LOCATION OF THE PIN CONNECTORS WITH RESPECT TO THE CONNECTOR PADS TO ENSURE A GOOD ELECTRICAL CONNECTION BETWEEN THE HGA AND THE CONTROLLER.
540

↓

END
550

FIG. 5

HEAD GIMBAL ASSEMBLY (HGA) CONNECTOR PAD ALIGNMENT JIG

TECHNICAL FIELD

The present invention relates to the field of hard disk drive development, and more particularly to the testing of a head gimbal assembly.

BACKGROUND ART

Direct access storage devices (DASD) have become part of everyday life, and as such, expectations and demands continually increase for better performance at lower cost. To meet these demands, the mechano-electrical assembly in a DASD device, specifically the Hard Disk Drive (HDD) has evolved to meet these demands.

An HDD is comprised of many complex parts and sub-assemblies. Each of these sub-assemblies has a manufacturing process that is required to produce a sub-assembly that functions as specified and produce these sub-assemblies in a minimal amount of time. Marginally performing sub-assemblies when coupled with other sub-assemblies can lead to marginal performance of the HDD and possibly failure of the entire HDD. Rejects and failures of sub-assemblies and longer than necessary manufacturing time equate to added cost to the final HDD.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A head gimbal assembly (HGA) connector pad alignment jig is disclosed. One embodiment provides an HGA testing jig for holding an HGA, the HGA testing jig including an opening at a location of the HGA connector pads. In addition, an HGA testing apparatus including a disk for testing the HGA and a controller with a plurality of pin connectors for providing control information to the HGA during a testing process. Thus, the present technology provides an alignment adjuster for adjusting the location of the pin connectors with respect to the connector pads to ensure a good electrical connection between the HGA connector pads and the pin connectors.

BRIEF DESCRIPTION OF THE DRAWINGS

FIG. 5 is a flowchart of a method for forming an integrated flexure tongue micro-actuator in accordance with one embodiment of the present invention.

BEST MODES FOR CARRYING OUT THE INVENTION

Figure 1:
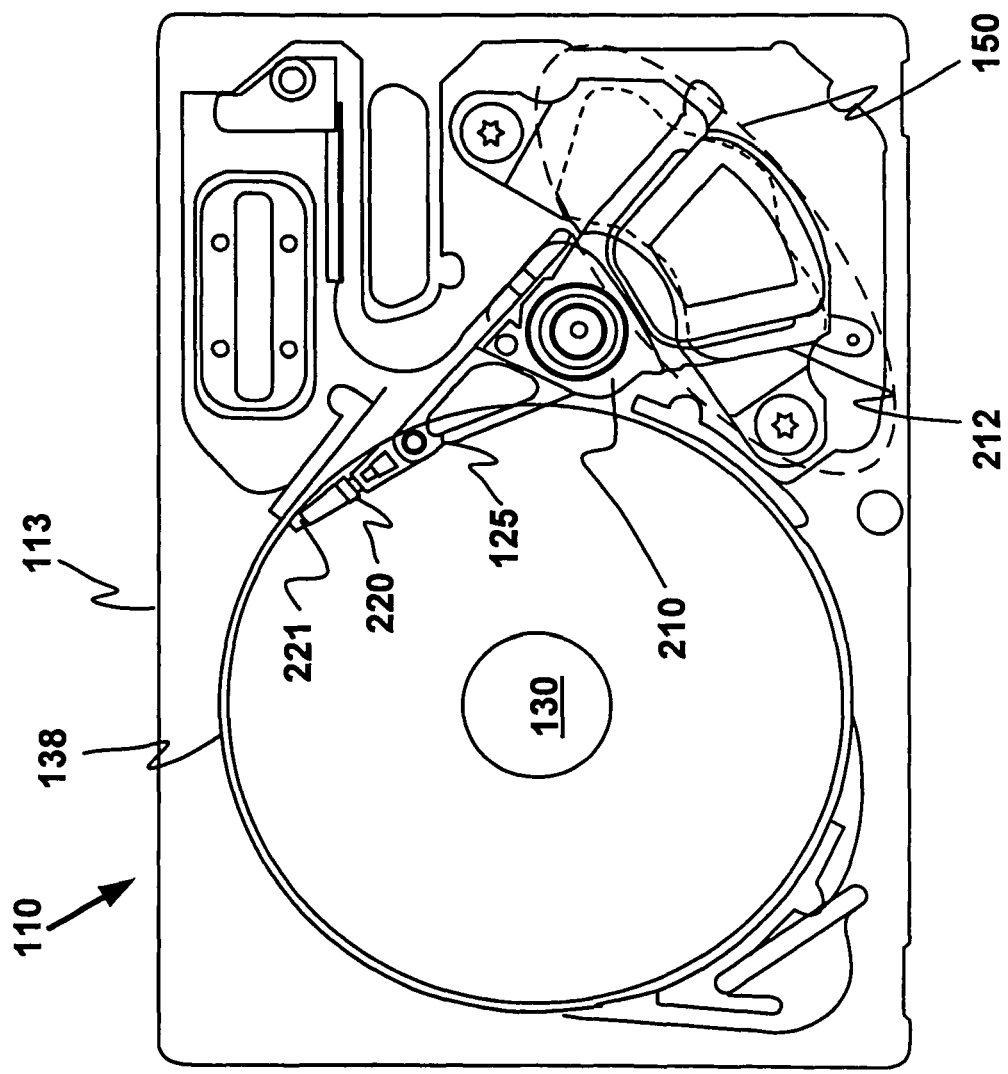
FIG. 1 is a plan view of an HDD with cover and top magnet removed in accordance with one embodiment of the present invention.

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a HDD and components connected therewith. The discussion will then focus on embodiments of a method and system for testing the HGA.

Overview

Present HDD manufacture is driven by consumer demand for smaller and more portable hard drives such as those used in personal digital assistants (PDAs), MP3 players, and the like. For example, modern hard disk drives are much smaller and include disk diameters of less than 2.5 inches (micro drives are significantly smaller than that). Advances in magnetic recording are also reasons for the reduction in size.

However, with the use of smaller components industry standards of manufacture, testing and operation must also be re-evaluated. For example, by reducing the read/write tolerances of the head portion, the tracks on the disk can be reduced in size by the same margin. Thus, as modern micro recognition technology is applied to the head, the track size on the disk can be further compressed thereby enabling more tracks to be included on the disk, resulting in the disk having an increase data storage capacity.

As part of the production process of hard disk drives, multiple tests are typically run on each Head Gimbal Assembly (HGA) to determine whether it satisfies performance specifications and/or size tolerances. Specifically, HGA testing consists of coupling the HGA with a testing device such as a dynamic electrical testing (DET) device.

However, the present sizes of HGA components including the pin and contact pad sizes make the simple placement of an HGA into a testing jig extremely challenging. That is, because the sizes of the pins, and even the sizes of the pads coupled with the HGA control lines, are so small it is quite easy establish a poor connection, to bend a pin or even to miss the connection completely. Such a connection issue, if unrealized, can result in a perfectly viable HGA failing a testing procedure and being discarded or recycled. As such, the present invention provides a method for ensuring that the connection between the pins of the testing jig and the pads of the HGA are correctly connected such that connection failure can be quickly ruled out during the HGA testing process.

Further, the present technology significantly increases the time to make the connection, for example, the connection time is increased from tens of minutes to tens of seconds. Thus, significant time savings resulting in significant manufacturing money savings is realized. Further, throughput is also increased while the false failure rate of HGA components is significantly decreased. In addition, the present testing technology is backward compatible with existing testing machinery thereby providing instant market availability and utilization.

Operation

With reference now to FIG. 1, a schematic drawing of one embodiment of an information storage system including a magnetic hard disk file or HDD 110 for a computer system is shown. Although, only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 210. When a number of actuator arms 210 are present, they are usually represented in the form of a comb that is movably or pivotally mounted to base/housing 113. A controller 150 is also mounted to base 113 for selectively moving the actuator arms 210 relative to the disk 138. Actuator assembly 140 may be coupled with a connector assembly to convey data between arm electronics and a host system, such as a computer, wherein HDD 110 resides.

In one embodiment, each actuator arm 210 has extending from it at least one cantilevered integrated lead suspension (ILS) 224. The ILS 224 may be any form of lead suspension that can be used in a data access storage device. The level of integration containing the slider 221, ILS 224, and read/write head is called the Head Gimbal Assembly (HGA).

The ILS 224 has a spring-like quality, which biases or presses the air-bearing surface of slider 221 against disk 138 to cause slider 221 to fly at a precise distance from disk 138. ILS 224 has a hinge area that provides for the spring-like quality, and a flexing interconnect that supports read and write traces and electrical connections through the hinge area. A voice coil 212, free to move within a conventional voice coil motor magnet assembly is also mounted to actuator arms 210 opposite the head gimbal assemblies. Movement of the actuator assembly 210 by controller 150 causes the head gimbal assembly to move along radial arcs across tracks on the surface of disk 138.

Figure 2:
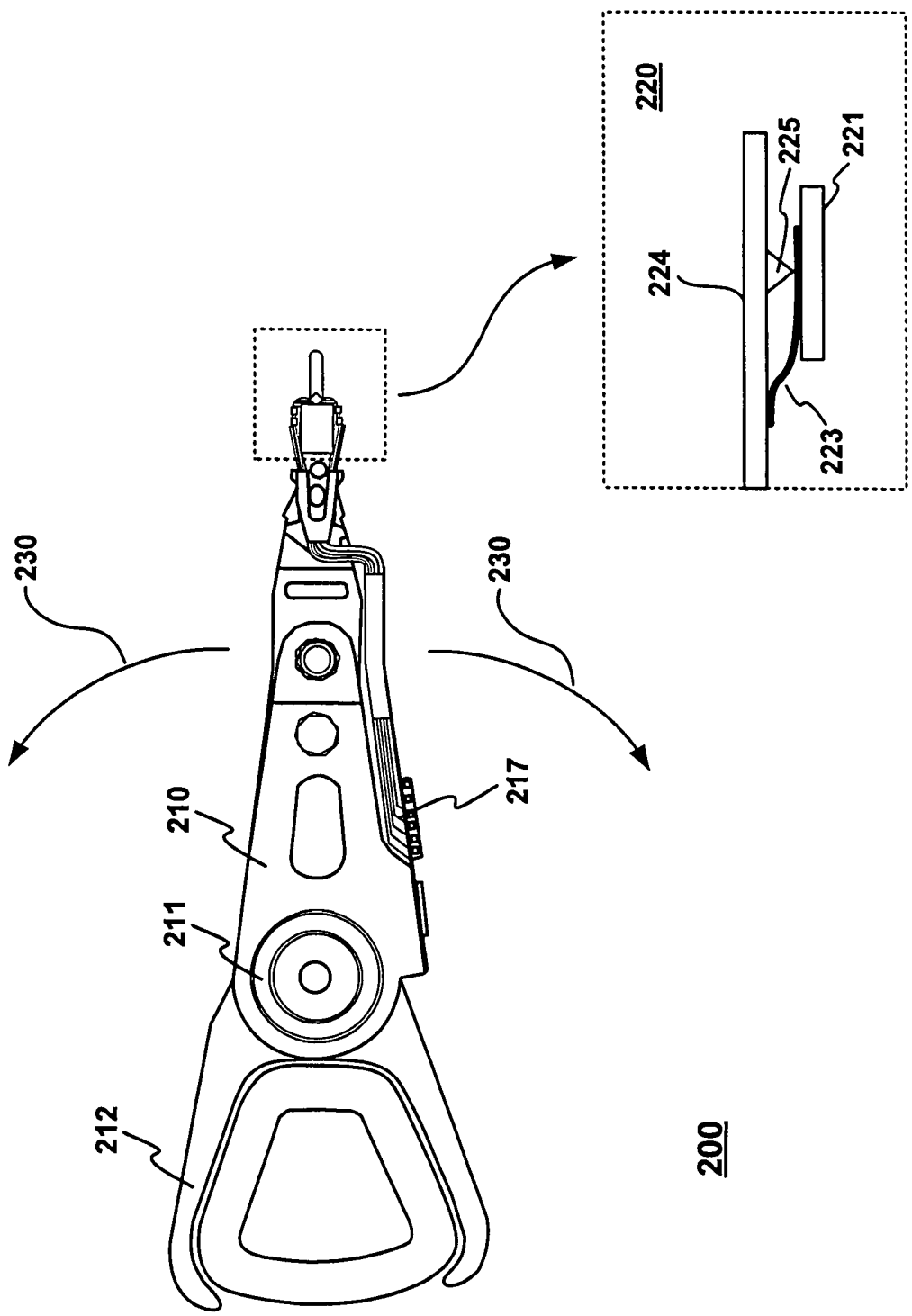
FIG. 2 is an isometric view of an actuator arm and a magnified, cross-sectional view of a head gimbal assembly (HGA), in accordance with an embodiment of the present invention.

With reference now to FIG. 2, an actuator arm configuration 200 in accordance with an embodiment of the present invention is shown. An actuator arm 210 is coupled with a head gimbal assembly 220 that comprises a magnetic read/write head (not shown). The magnetic read/write transducer or head is coupled with a slider 221. The head gimbal assembly 220 further comprises a flexure 223 coupled with a lead suspension 224. In one embodiment, the flexure 223 supports the slider 221 relative to the lead suspension 224, while a dimple 225 separates the flexure 223 from the lead suspension 224. Movement (illustrated by arrows 230) of the actuator arm 210 moves the head gimbal assembly 220 relative to the magnetic storage medium 138 such that the read/write head can magnetically read data from and/or magnetically write data to different points along the surface of the magnetic storage medium 138.

In one embodiment, each actuator arms 210 in HDD 110 has its own head gimbal assembly and the head gimbal assemblies of the plurality of parallel actuator arms 210 operate in unison with one another. However, in another embodiment HDD 110 may use multiple actuator arms 210 configured to move independently of one another.

Figure 3:
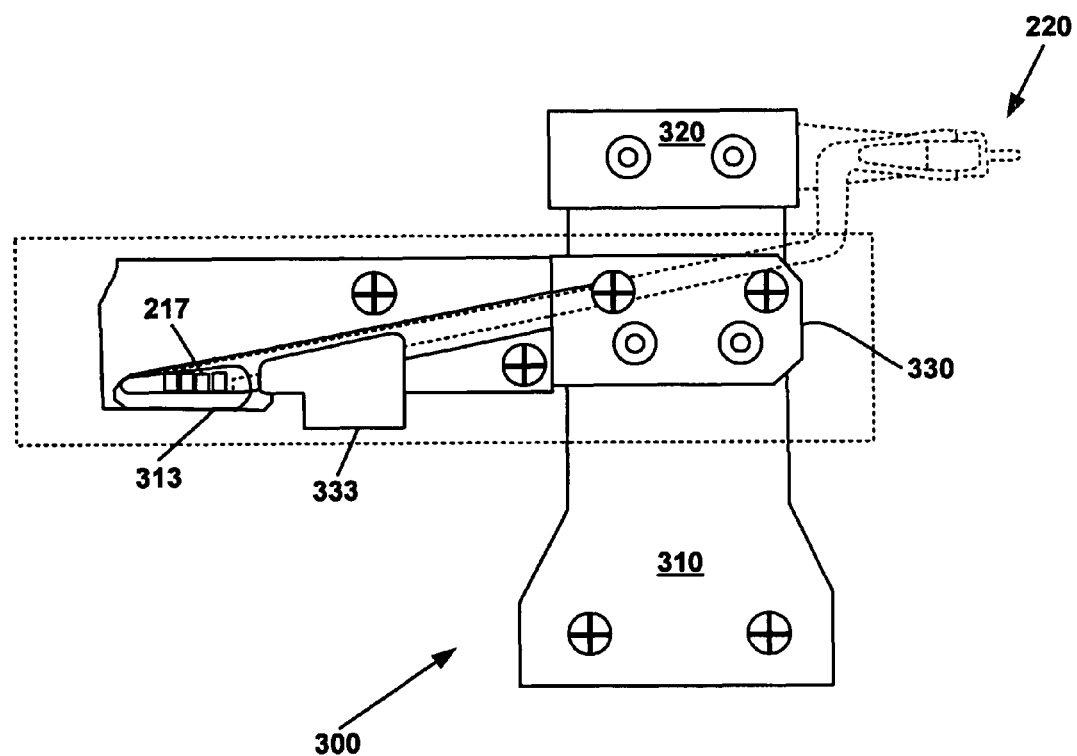
FIG. 3 is a side view of an HGA testing jig in accordance with one embodiment of the present invention.

Referring now to FIG. 3, a block diagram of an HGA testing jig is shown in accordance with one embodiment. In general, jig 300 is utilized to test a HGA similar to that described in FIGS. 1 and 2. For example, the jig 300 tests an HGA 220 by having the HGA perform writes and reads on a disk associated with the jig 300. After HGA 220 has passed the testing stage, it continues through the manufacturing process thereby matching FIG. 2 and ultimately the components of FIG. 1.

As such, the parts and components of HGA 220 and the test bed disk that are utilized by jig 300 during the testing process are incorporated herein by reference and are not described in detail again for purposes of brevity and clarity. However, in addition to the standard HDD parts needed to test the read and write capabilities of the HGA 220, jig 300 also includes a base portion 310 and a cap portion 320. In one embodiment, the base portion 310 and cap portion 320 are provided for stability. However, it is appreciated that the present technology may be used without either base portion 310 and/or cap portion 320. In another embodiment, base portion 310 and/or cap portion 320 may included additional testing components, computing parts or accessories, additional wiring or other support features or the like.

In one embodiment, jig 300 also includes a long tail guide 330 formed to approximate the shape and size of an actuator arm 210 of FIG. 2. Jig 300 also includes an opening 313 and a coupling link 333. In general, coupling link 333 allows the jig 300 to be connectively coupled with the entire testing assembly. In one embodiment, opening 313 allows visual access to the flexure pads 217 of the HGA 220. As such, when coupling jig 300 with an entire testing assembly, the coupling of the connector pins of the testing assembly, e.g., the pins providing the corresponding electrical connection to the HGA 220 via the flexure pads 217 may be visually ascertained. In addition, any anomalies that may occur during the electrical coupling, such as bent pins, missing or off-center connections between pins and pads, etc., may be recognized.

Figure 4:
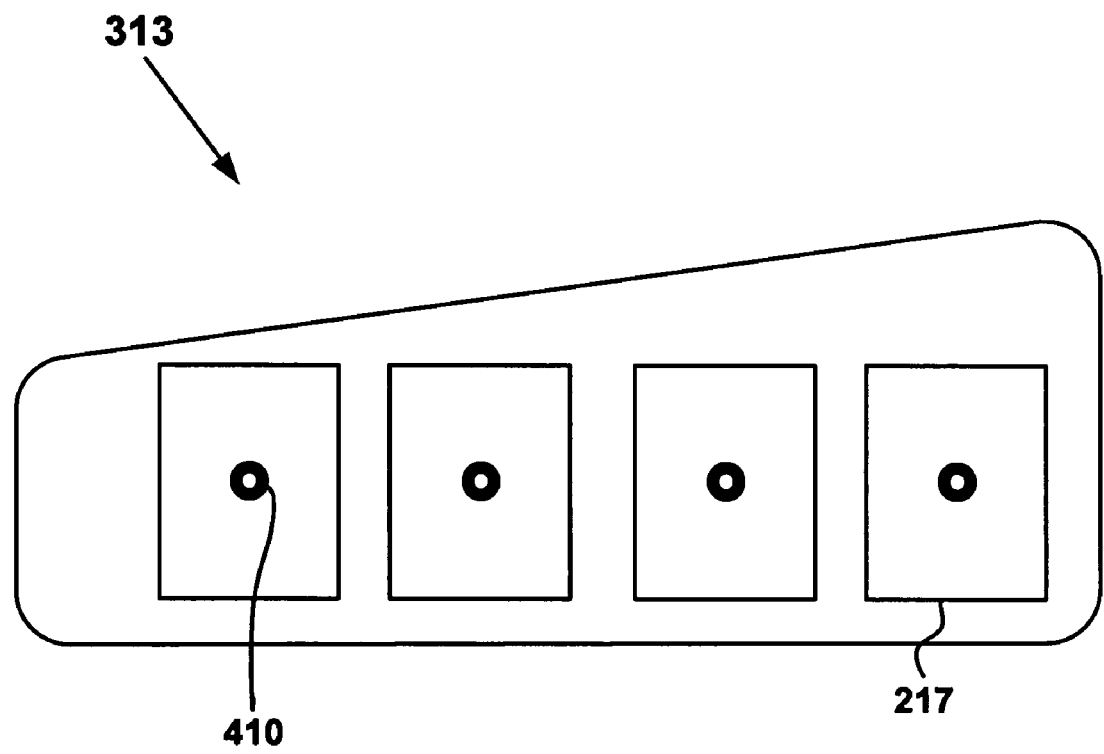
FIG. 4 is a close-up view of an opening in the HGA testing jig in accordance with one embodiment of the present invention.

Referring now to FIG. 4, a block diagram illustration of the opening 313 and corresponding underlying flexure pads 217 is shown in accordance with one embodiment of the present invention. In addition, flexure pads 217 of diagram 400 clearly provide visual feedback of the location 410 of the pins on the flexure pads 217. In one embodiment, the visual feedback of the location 410 can be performed while the pins are in place by looking at the side of the opening 313. However, in another embodiment, the visual feedback of the location 410 can be performed after the pins were in place and subsequently removed by looking through opening 313 after the pins were placed.

In so doing, the present technology provides almost instant alignment and electrical connectivity feedback regarding the control pins of the testing device and the connection characteristics of the flexure pads 217 with which they either are or previously were coupled. Further, during the testing process, should any anomalistic behavior occur with respect to HGA 220, the present technology allows a tester to quickly ascertain if it is the connection causing the adverse behavior or if another more significant issue is the culprit.

With reference now to FIG. 5, a flowchart 500 providing a method for aligning head gimbal assembly (HGA) flexure cable connector pads with an HGA testing apparatus is provided in accordance with one embodiment of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. The following description of flowchart 500 shall refer to FIGS. 3 and 4.

At 510 of FIG. 5, the method begins.

With reference now to 520 of FIG. 5 and to FIGS. 3 and 4, one embodiment positions an HGA 220 having a flexure cable and connector pads 217 in a testing jig 300 including an opening 313 at a location of the connector pads 217.

With reference now to 530 of FIG. 5 and to FIGS. 3 and 4, one embodiment positions the testing jig 300 with an HGA testing apparatus including a disk for testing the HGA 220 and a controller with a plurality of pin connectors for controlling the HGA 220 during the testing process.

With reference now to 540 of FIG. 5 and to FIGS. 3 and 4, one embodiment adjusts the location of the pin connectors with respect to the connector pads 217 to ensure a good electrical connection between the HGA 220 and the controller.

In one embodiment, a cutaway portion at the opening 313 of the testing jig 300 is also utilized to provide additional visual access to the connector pads 217. In another embodiment, at least a portion of arm 333 includes a clear portion around the opening 313 of the testing jig 300, the clear portion providing visual access to the connector pads 217 while maintaining a physical barrier against contamination.

In yet another embodiment, at least a portion of arm 333 includes a clear portion around the opening 313 of the testing jig 300, the clear portion having a marking 410 thereon, the marking 410 providing visual alignment properties between the pin connectors and the connector pads 217 while maintaining a physical barrier against contamination. In another embodiment, a visual magnifying apparatus is provided at the testing jig 300 in proximity to or coupled with the opening 313 to provide enhanced visual alignment properties and capabilities between the pin connectors and the connector pads 217 while maintaining a physical barrier against contamination.

In one embodiment, the testing apparatus may include at least one manual adjuster such as the screws shown in 310, 320 and 330 for manually adjusting the alignment with respect to the pin connectors and the connector pads 217. However, in another embodiment, the testing apparatus may include at least one auto-adjuster for automatically adjusting the alignment with respect to the pin connectors and the connector pads 217.

At step 550, the method ends.

The process of pin alignment can be repeated, for example, for calibration testing, when replacing testing arm 330, or any other time. Further, after aligning the pins and connectors, following HGA testing can utilize the same jig with or without the initial alignment opening 313 without concern of connector pad/pin alignment issues. This method and apparatus is also compatible with present manufacturing methods and techniques and does not necessarily require any additional adjustments to the present manufacturing methods or tools other than those provided herein.

Moreover, various embodiments of the present invention can be used in combination with longitudinal recording as well as perpendicular recording. Manufacturers are trying to make disk drives with higher and higher density. Smaller track widths are used to accomplish higher densities.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A head gimbal assembly (HGA) connector pad alignment jig comprising:
    an HGA testing jig for holding an HGA, said HGA testing jig comprising:
        an opening at a location of said HGA connector pads, wherein said opening is configured for visual access to said HGA connector pads; and
        a clear portion disposed around said opening, said clear portion configured for visual access to said HGA connector pads and maintaining a physical barrier against contamination;
    an HGA testing apparatus comprising a disk for testing said HGA and a controller with a plurality of pin connectors for providing control information to said HGA during a testing process; and
    an alignment adjuster for adjusting the location of the pin connectors with respect to the connector pads to ensure a good electrical connection between said HGA connector pads and said pin connectors.

2. The HGA connector pad alignment jig of claim 1, comprising:
    a coupling link for mechanically coupling said HGA with the testing jig.

3. The HGA connector pad alignment jig of claim 1, wherein the testing jig has a cutaway portion at said opening of said testing jig, said cutaway portion providing visual access to said connector pads.

4. The HGA connector pad alignment jig of claim 1, wherein said clear portion having a marking thereon, said marking providing visual alignment properties between said pin connectors and said connector pads while maintaining a physical barrier against contamination.

5. The HGA connector pad alignment jig of claim 1, wherein the testing jig has a visual magnifying apparatus in proximity to said opening to provide enhanced visual alignment capabilities between said pin connectors and said connector pads while maintaining a physical barrier against contamination.

6. The HGA connector pad alignment jig of claim 1 wherein said alignment adjuster comprises:
    a manual adjuster for manually adjusting the alignment with respect to said pin connectors and said connector pads.

* * * * *